United States Patent
Colibro et al.

(10) Patent No.: US 9,865,266 B2
(45) Date of Patent: Jan. 9, 2018

(54) METHOD AND APPARATUS FOR AUTOMATED SPEAKER PARAMETERS ADAPTATION IN A DEPLOYED SPEAKER VERIFICATION SYSTEM

(71) Applicant: Nuance Communications, Inc., Burlington, MA (US)

(72) Inventors: Daniele Ernesto Colibro, Alessandria (IT); Claudio Vair, Borgone Susa (IT); Kevin R. Farrell, Medford, MA (US)

(73) Assignee: Nuance Communications, Inc., Burlington, MA (US)

( * ) Notice: Subject to any disclaimer, the term of this patent is extended or adjusted under 35 U.S.C. 154(b) by 326 days.

(21) Appl. No.: 13/776,502

(22) Filed: Feb. 25, 2013

(65) Prior Publication Data

US 2014/0244257 A1    Aug. 28, 2014

(51) Int. Cl.
*G10L 17/06* (2013.01)
*G10L 17/04* (2013.01)
(Continued)

(52) U.S. Cl.
CPC .............. *G10L 17/06* (2013.01); *G10L 17/04* (2013.01); *G10L 17/12* (2013.01); *G10L 17/20* (2013.01); *G10L 17/22* (2013.01)

(58) Field of Classification Search
None
See application file for complete search history.

(56) References Cited

U.S. PATENT DOCUMENTS 5,719,921 A * 2/1998 Vysotsky .............. G10L 15/065
    379/189
5,864,810 A * 1/1999 Digalakis ................ G10L 15/07
    704/254
(Continued)

FOREIGN PATENT DOCUMENTS

EP    2770502 A1    8/2014
EP    2806425 A2    11/2014
(Continued)

OTHER PUBLICATIONS

Cumani, S., et al., "Fast Discriminative Speaker Verification in the I-Vector Space," in *Proceedings of ICASSP 2011*, pp. 4852-4855 (2011).
(Continued)

*Primary Examiner* — Edwin S Leland, III
(74) *Attorney, Agent, or Firm* — Hamilton, Brook, Smith & Reynolds, P.C.

(57) ABSTRACT

Typical speaker verification systems usually employ speakers' audio data collected during an enrollment phase when users enroll with the system and provide respective voice samples. Due to technical, business, or other constraints, the enrollment data may not be large enough or rich enough to encompass different inter-speaker and intra-speaker variations. According to at least one embodiment, a method and apparatus employing classifier adaptation based on field data in a deployed voice-based interactive system comprise: collecting representations of voice characteristics, in association with corresponding speakers, the representations being generated by the deployed voice-based interactive system; updating parameters of the classifier, used in speaker recognition, based on the representations collected; and employing the classifier, with the corresponding parameters updated, in performing speaker recognition.

18 Claims, 4 Drawing Sheets

(51) Int. Cl.
*G10L 17/12* (2013.01)
*G10L 17/20* (2013.01)
*G10L 17/22* (2013.01)

(56) References Cited

U.S. PATENT DOCUMENTS

| | | | | |
|---|---|---|---|---|
| 6,697,778 | B1* | 2/2004 | Kuhn | G10L 17/02 704/243 |
| 6,934,681 | B1* | 8/2005 | Emori | G10L 15/12 704/246 |
| 7,299,177 | B2* | 11/2007 | Broman | G06Q 20/341 379/88.02 |
| 7,415,100 | B2* | 8/2008 | Cooper | H04M 3/527 379/88.01 |
| 7,991,614 | B2* | 8/2011 | Washio | G10L 15/05 704/210 |
| 8,433,567 | B2* | 4/2013 | Aronowitz | G06N 7/005 704/235 |
| 9,258,425 | B2 | 2/2016 | Krause | |
| 9,401,140 | B1* | 7/2016 | Weber | G10L 15/00 |
| 9,406,298 | B2 | 8/2016 | Cumani et al. | |
| 2003/0108160 | A1* | 6/2003 | Brown | H04M 3/42 379/88.01 |
| 2004/0083104 | A1* | 4/2004 | Liu | G10L 15/28 704/245 |
| 2007/0043565 | A1* | 2/2007 | Aggarwal | G10L 15/063 704/245 |
| 2007/0129941 | A1* | 6/2007 | Tavares | G10L 17/26 704/226 |
| 2008/0205624 | A1* | 8/2008 | Mandalia | H04M 3/51 379/265.02 |
| 2010/0278317 | A1 | 11/2010 | Broman et al. | |
| 2011/0004475 | A1* | 1/2011 | Bellegarda | G10L 15/08 704/251 |
| 2011/0040561 | A1* | 2/2011 | Vair | G10L 17/04 704/240 |
| 2011/0093427 | A1* | 4/2011 | Waite | G06N 99/005 706/52 |
| 2011/0119060 | A1* | 5/2011 | Aronowitz | G10L 17/02 704/250 |
| 2011/0282661 | A1* | 11/2011 | Dobry | G10L 17/02 704/231 |
| 2012/0263285 | A1 | 10/2012 | Rajakumar et al. | |
| 2013/0201155 | A1* | 8/2013 | Wu | G06F 3/03547 345/174 |
| 2013/0225128 | A1* | 8/2013 | Gomar | H04W 12/06 455/411 |
| 2014/0222423 | A1* | 8/2014 | Cumani | G10L 17/02 704/234 |
| 2014/0222428 | A1* | 8/2014 | Cumani | G10L 17/02 704/250 |
| 2014/0244257 | A1* | 8/2014 | Colibro | G10L 17/06 704/246 |
| 2014/0348308 | A1* | 11/2014 | Krause | G10L 17/00 379/88.02 |
| 2017/0133007 | A1* | 5/2017 | Drewes | G10L 15/063 |

FOREIGN PATENT DOCUMENTS

WO   WO 2006/126183 A2   11/2006
WO   WO 2013/124455 A1   8/2013

OTHER PUBLICATIONS

Glembek, O., et al., "Simplification and Optimization of I-Vector Extraction," in *Proceedings of ICASSP 2011*, pp. 4516-4519 (2011).
Aronowitz, H. and Barkan, O., "Efficient Approximated I-Vector Extraction," in *Proceedings of ICASSP 2012*, pp. 4789-4792 (2012).
Kenny, P., "A Small Footprint i-Vector Extractor," in *Proceedings of Odyssey 2012*, pp. 1-6 (2012).
Cumani, S., et al., "Memory and computation effective approaches for i-vector extraction," in *Proceedings of Odyssey 2012*, pp. 7-13 (2012).
Kenny, P., "Joint Factor Analysis of Speaker and Session Variability: Theory and Algorithms," 2005. Technical report CRIM-06/08-13.
Extended European Search Report, EP 14156022.7, "Method and Apparatus for Automated Speaker Parameters Adaptation in a Deployed Speaker Verification System", dated May 22, 2014.
Yin, Shou-Chun, et al., "A Joint Factor Analysis Approach to Progressive Model Adaptation in Text-Independent Speaker Verification", IEEE Transaction on Audio, Speech, and Language Processing. vol. 15, No. 7, pp. 1999-2010, (Sep. 2007).

* cited by examiner

FIG. 4A

| ZN (EER=1.4%) | EER: SUPPLEMENTAL RETRAINING 421 | | | EER: REPLACEMENT RETRAINING 423 | | |
|---|---|---|---|---|---|---|
| | 5 UTTS/SPKR | 7 UTTS/SPKR | 9 UTTS/SPKR | 5 UTTS/SPKR | 7 UTTS/SPKR | 9 UTTS/SPKR |
| 130 SPEAKERS | 1.3% | 1.2% | 1.2% | 4.3% | 2.2% | 1.8% |
| 260 SPEAKERS | 1.3% | 1.1% | 1.1% | 0.9% | 0.9% | 0.9% |
| 400 SPEAKERS | 1.1% | 1.1% | 1.1% | 0.4% | 0.4% | 0.3% |

FIG. 4B

| PCTN (EER=1.6%) | EER: SUPPLEMENTAL RETRAINING 481 | | | EER: REPLACEMENT RETRAINING 483 | | |
|---|---|---|---|---|---|---|
| | 5 UTTS/SPKR | 7 UTTS/SPKR | 9 UTTS/SPKR | 5 UTTS/SPKR | 7 UTTS/SPKR | 9 UTTS/SPKR |
| 130 SPEAKERS | 1.6% | 1.6% | 1.5% | 5.5% | 2.8% | 2.2% |
| 260 SPEAKERS | 1.5% | 1.5% | 1.5% | 0.8% | 0.8% | 0.6% |
| 400 SPEAKERS | 1.5% | 1.4% | 1.3% | 0.7% | 0.2% | 0.3% |

METHOD AND APPARATUS FOR AUTOMATED SPEAKER PARAMETERS ADAPTATION IN A DEPLOYED SPEAKER VERIFICATION SYSTEM

BACKGROUND OF THE INVENTION

With significant advances in speech processing technology, voice biometrics are becoming an important tool in user verification. In a wide range of systems and services, speaker verification is employed or considered for deployment. The interest in speaker verification techniques drives research towards improving reliability and efficiency of speaker identification systems.

SUMMARY OF THE INVENTION

Speaker identification, or verification, techniques typically employ parameters generated using data sets collected during a pre-deployment phase or enrollment phase. Such data sets may not be large enough or rich enough to encompass intra-speaker variability in voice characteristics and highlight inter-speaker variability. As such, speaker identification trained with such data sets may not provide the expected reliability in speaker identification. According to at least one embodiment, actual field audio data received by a deployed voice-based interactive system is used to update parameters of a corresponding classifier.

According to at least one embodiment, a method and a corresponding apparatus for performing speaker verification comprises collecting representations of voice characteristics, in association with corresponding speakers, the representations being generated by a deployed voice-based interactive system; updating parameters of a classifier used in speaker identification based on the representations collected; and employing the classifier, with the corresponding parameters updated, in performing speaker identification.

The classifier may employ at least one score normalization. As such, in updating parameters of the classifier, the score normalization(s) is/are further updated. In collecting representations of voice characteristics, a speaker identity is further collected in association with at least one representation of voice characteristics of a corresponding speaker. The representations of voice characteristics are computed, for example, based on field data received by the deployed voice-based interactive system. The representations of voice characteristics represent inter-speaker and intra-speaker variations in voice characteristics and may further be generated using audio data received by the deployed voice-based interactive system.

In updating the parameters of the classifier, the updating may be performed based on a subset of the representations of the voice characteristics collected. The subset of the representations of voice characteristics may be selected based on one or more criteria. Such criteria include representations associated with successful identification of a speaker by the deployed voice-based interactive system, representations exhibiting large variations, with respect to corresponding representations previously maintained by the deployed voice-based interactive system, or the like. The updating of the parameters of the classifier may be performed, for example, each time a given number of successful identifications, of at least one speaker, is achieved. Updating the parameters of the classifier includes, for example, updating one or more representations of voice characteristics associated with a speaker.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 4A and 4B are tables illustrating simulation results of adaptive user verification according to at least an embodiment.

DETAILED DESCRIPTION OF THE INVENTION

A description of example embodiments of the invention follows.

Voice biometrics are becoming a valuable tool in identifying or authenticating users of a wide range of systems or services. Voice biometrics are typically obtained from training data and then used in a deployed system in speaker identification or verification. Speaker verification accuracy in the field, i.e., in a deployed system, may be hindered by the mismatch between data used to train the system-level parameters such as background models, transformations, channel compensation, etc., and the data encountered during deployment. System or application deployment typically includes a tuning phase during which audio data representative of the deployment environment is collected and used to update system-level parameters or generate user-specific voice biometrics. However, due to business, technical, or other constraints, it is typically common that the quantity of audio data collected during the tuning phase may not be sufficient to guarantee system performance with high reliability under different conditions. For example, audio data collected or recorded during the tuning phase for a specific user may not reveal the variability in voice channel or user voice characteristics. As such, the system performance after deployment may suffer from relatively high rates of false alarms or missed targets in identifying speakers.

According to at least one embodiment, actual field data collected in deployed applications is used to adapt at least one parameter employed in speaker verification. In particular, in an i-vector based automatic speaker recognition system, described below in detail in reference to FIG. 1, i-vectors generated based on actual field data are used to update system parameters. Updating system parameters adaptively based on actual field data, allows accuracy of speaker recognition applications to improve over time while incurring minimal overhead in terms of disk occupancy, computational complexity, or human supervision. Speaker verification system adaptation may be employed without jeopardizing system security.

Figure 1:
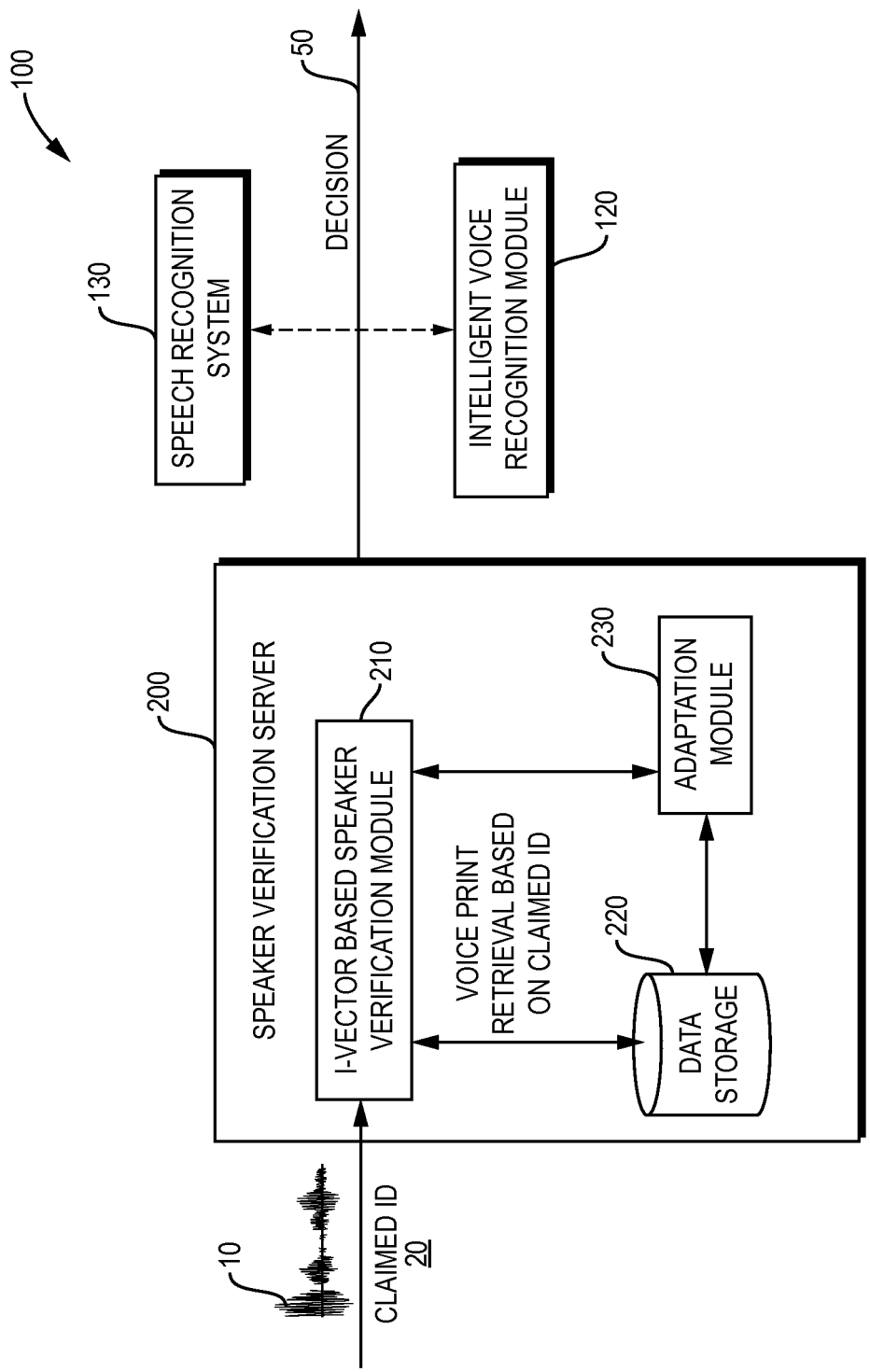
FIG. 1 is a block diagram of a voice-based user-interactive system according to at least one embodiment.

FIG. 1 is a block diagram of a voice-based user-interactive system 100 employing voice biometrics in user authentication according to at least one example embodiment. In the voice-based user-interactive system 100, at least one speech signal 10 and a claimed identification (ID) 20 are provided by a user to a speaker verification server 200. The at least one speech signal 10, a sample of the user's voice, may be an utterance spoken by the user one or more times. The claimed ID 20 may be a subscriber login, a password, an account number, other user-ID data piece, or a combination thereof. The speaker verification server 200 is configured to identify the user based on the received speech signal(s) 10 and verify the identified user against the received claimed ID 20. The speaker verification server 200 outputs a decision 50 with regard to the user ID verification. The decision 50 is then provided to one or more modules to act upon it. For example, the verification decision 50 may be provided to an intelligent voice recognition module 120, which is configured to allow user access to a requested service or request more information or data from the user based on the speaker verification decision 50. The speaker verification decision may be used by a speech recognition system 130 to determined user-specific speech recognition parameters to be employed.

According to at least one example embodiment, the speaker verification server 200 includes an i-vector based speaker verification module 210, a data storage 220, and an adaptation module 230. The i-vector based speaker verification module 210 is configured to perform speaker verification processing functions based on an i-vector framework. The i-vector modeling framework is a commonly used approach for speaker recognition due to its relatively high accuracy and small footprint. It is an elegant way of describing rich information conveyed by a speech utterance in terms of a relatively small-dimensional vector of statistical parameters. Typical i-vector sizes are relatively small, e.g., about 400 floating point parameters, compared to the digital audio recording size, from which i-vectors are computed. In performing speaker verification or identification, the i-vector based speaker verification module 210 employs background statistical parameters, usually determined prior to system deployment, previously generated i-vectors representing speakers' voice characteristics, and i-vectors generated based on speech signal(s) 10 corresponding to a user or speaker to be identified or verified. The data storage 220 may be a database, a data structure, or a memory component configure to store i-vectors previously generated, e.g., during an enrollment phase or a verification phase, representing speakers' voice characteristics. The adaptation module 230 is configured to use i-vectors generated based on actual field data, after system deployment, to update previously stored parameters employed by the i-vector based verification module 210.

Figure 2:
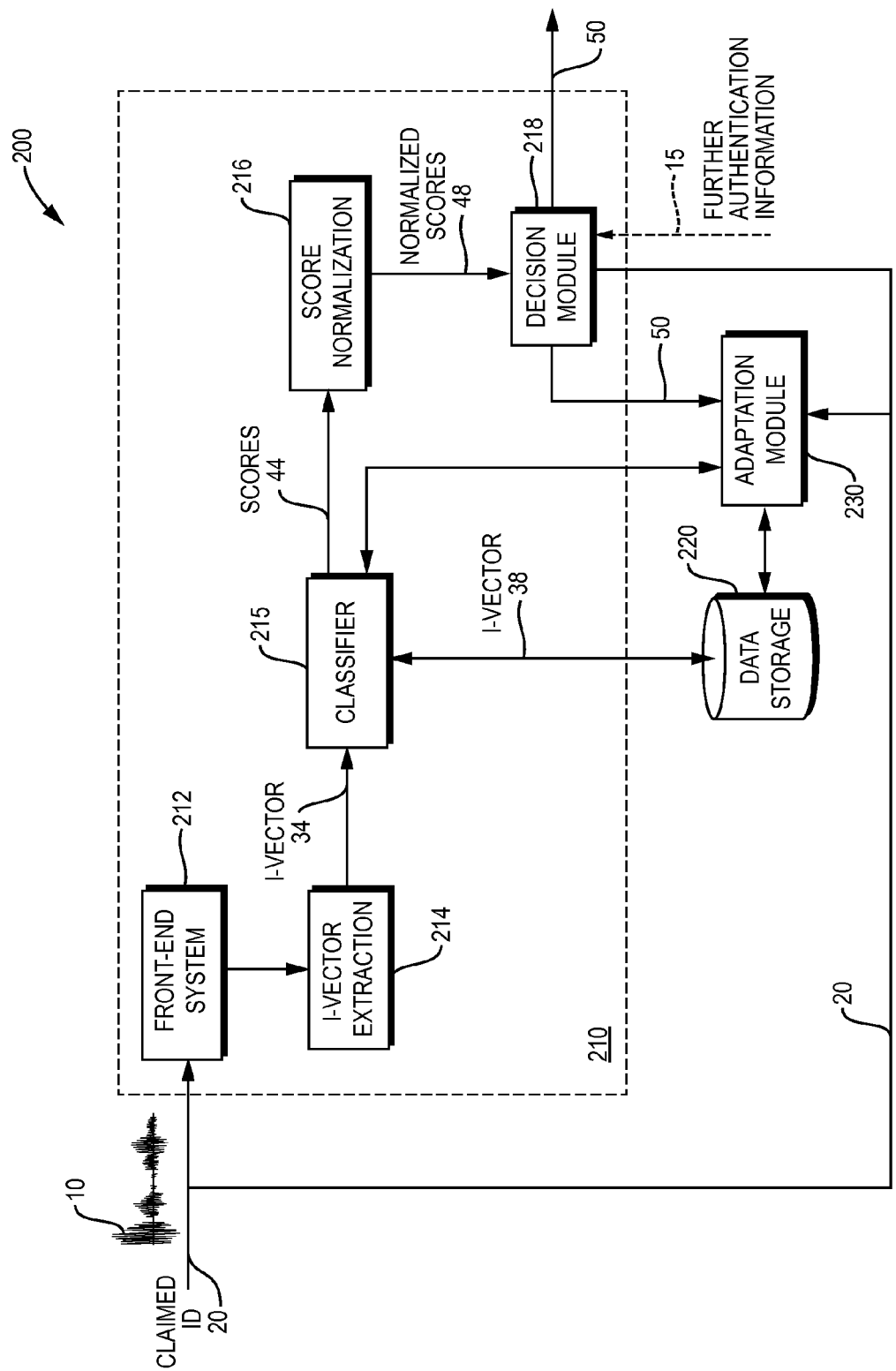
FIG. 2 is a block diagram illustrating functional components of a speaker verification server according to at least one embodiment.

FIG. 2 is a block diagram illustrating functional components of the speaker verification server 200 according to at least one embodiment. In particular, the i-vector based speaker verification module 210 includes a front-end system 212, an i-vector extraction module 214, a classifier 215, a score normalization module 216, and a decision module 218. The front-end system 212 is configured to extract feature coefficients from a received speech signal 10. Examples of voice features include Mel frequency cepstral coefficients (MFCCs), linear prediction cepstral coefficients (LPCC), perceptual linear predictive (PLP) cepstral coefficients, or the like. The i-vector extraction module 214 is configured to generate one or more i-vectors based on the extracted feature coefficients. Given a sequence of feature vectors, referred to as $\chi = x_1, x_2, \ldots, x_t$, extracted from the speech signal 10 for an individual user, one or more i-vectors are generated by the i-vector extraction module 214 based on an a-priori distribution of the i-vectors and the i-vector framework described as $$s = m + T \cdot w,$$

where m is a Universal Background Model (UBM) super-vector representing statistical parameters, e.g., a plurality of mean vectors, associated with distributions of feature vectors extracted from training background audio data, s is a super-vector representing corresponding statistical parameters, e.g., a plurality of mean vectors, associated with distributions of feature vectors corresponding to the individual user, T is a low-rank rectangular matrix including vectors which span a subspace representing potential variations of the super-vector s with respect to the background statistical parameters in m, and w is an i-vector corresponding to the individual user.

The classifier 215 is configured to compare i-vectors 34 generated based on received speech signal(s) 10 to previously generated and stored i-vectors 38 corresponding to the user identified by the claimed ID 20. The classifier 215 generates a verification score 44 indicative of the likelihood of the speech signal 10 being associated with the user indicated by the claim ID 20. The verification score is then normalized by the score normalization module 216, and the corresponding normalized score 48 is fed to the decision module 218. The decision module 218 is configured to make a decision 50 on whether or not the received speech signal 10 corresponds to the user defined by the claimed ID 20. The classifier 215 may employ a Probabilistic Linear Discriminant Analysis (PLDA) classification approach, Support Vector Machine (SVM) classification approach, Linear Discriminant Analysis (LDA) followed by Within Class Covariance Normalization (WCCN), or the like.

Regardless of the classification approach employed, most classifiers typically make use of training data for computing the parameters of the corresponding classification model. Classifier parameters are expected to reflect distinguishability between different speakers by emphasizing or maximizing inter-speaker variations, while at the same time accommodating intra-speaker variability. In order to fulfill such expectation, classifiers are typically trained using large speech corpora with recordings labeled in terms of speaker identity. When such data is available in meaningful quantity, e.g., hundreds of speakers or more each providing audio data across multiple recording sessions representative of different channels in the deployment environment, reliable speaker recognition accuracy may be achieved using an i-vector based speaker verification approach. Unfortunately, on one hand, speech corpora suited for training i-vector systems targeting specific authentication scenarios are quite limited. In addition, collecting such data involves a significant effort and a high financial cost. On the other hand, systems trained with reduced or mismatched datasets fail to provide high accuracy.

In typical speaker verification applications, the users enroll in the voice-based interactive system 100 by providing samples of their voice. During the enrollment procedure, a user utters a password one or more times, e.g., three times. Depending upon the application design, passwords may differ or be the same among users. In response to password utterances, or enrollment utterances, provided by a user, at least one i-vector 38 is generated and maintained to represent voice characteristics of the user. For example, feature vectors extracted from all the utterances provided by a single user may be grouped together and a single i-vector is generated. Alternatively, an i-vector is generated from each utterance of a plurality of utterances provided by the single user resulting in a plurality of i-vectors representing the voice characteristics of the same user. The i-vectors generated during the enrollment procedure are then employed by the classifier 215 in performing speaker verification.

In training the classifier 215, a large and rich data set is typically used to generate a number of speaker-labeled i-vectors modeling intra- and inter-speaker variability in voice characteristics. Such data set may be obtained by setting up a field trial for collecting matching development data, using past speech recordings collected for similar applications, or mining free speech recordings, which are easy to find in commercial speech corpora designed for text independent speaker recognition, to obtain a general phonetic coverage. It is possible to train the classifier 215 with just limited quantities of speech data matching the application conditions and use other speech data coming from different collections or associated with other speech applications. As such, the resulting trained system may be suboptimal from the accuracy viewpoint, but with performance that may be comparable with a traditional Gaussian Mixture Model (GMM) based speaker verification system.

At a later time, the user accesses the voice-based interaction system 100, and speaker verification is performed to validate the user's identity. For example, the user may be asked to provide voice samples, e.g., one or more verification utterances 10. One or more i-vectors 34 are then generated, using the one or more verification utterances 10 provided, and scored by the classifier 215 against the corresponding i-vector(s) 38 created during the enrollment procedure.

According to at least one embodiment, performance of the speaker verification module 210 is improved by extending training of the classifier 215 beyond the training or enrollment phases. Specifically, field data collected for authenticating users, in a deployed speaker verification application, is employed to re-train the classifier 215 or update parameters thereof or other parameters associated with the speaker verification module. Once a speaker verification application is deployed, users are expected to have numerous authentication sessions with the system. The cost of storing the i-vectors related to the authentication trials is very low in terms of storage because of the low dimension of the i-vectors compared to corresponding super-vectors. The voice-based user-interactive system 100 allows to automatically label accepted user trials based on the authenticated speaker identity. In practice, a residual number of false positive errors may occur on impostor trials. However, the error percentage may be controlled using conservative authentication thresholds.

According to at least one embodiment, an adaptation module 230 coupled to the classifier 215 is configured to retrain the classifier or update parameters associated with the classifier 215 or other modules of the speaker verification server 200 after deployment. The adaptation module 230 may be further coupled to decision module 218 or the data storage 220, and may have access to the claimed ID 20 provided by a user accessing the voice-based interactive system 100. The adaptation module 230 receives at least a subset of the i-vector(s) 34 directly from the classifier 215 or through the storage 220. The received i-vector(s) is/are maintained by the adaptation module 230 and used to retrain the classifier 215 or update speaker verification parameters. The adaptation module 230 may use the claimed ID 20 as a speaker label to associate the received i-vector(s) to the corresponding user.

The adaptation module 230 may perform classifier adaptation according to one or more scenarios. According to at least one scenario, the adaptation is performed repeatedly, e.g., each time a meaningful number of new verification i-vectors 34 are received and maintained by the adaptation module 230 or every time period. The meaningful number of verification i-vectors may be defined by a minimum total number of new i-vectors with respect to a last training of the classifier 215, a minimum number of i-vectors for each user, a minimum number of users with associated i-vectors maintained by the adaptation module 230, or a combination thereof. The adaptation module 230 may define a new set of i-vectors, to be used in retraining the classifier 215, based on newly maintained i-vectors or i-vectors 38 used in a previous training/retraining of the classifier. For example, the defined set may include vectors from the newly maintained i-vectors only. Alternatively, the defined new set of i-vectors may be determined by modifying the set of i-vectors 38 previously used in training/retraining the classifier 215 with at least one of the newly maintained i-vectors 34.

The i-vectors maintained by the adaptation module 230 may be selected according to one or more criteria, such as i-vectors resulting in successful identification, i-vectors exhibiting different or large variation(s) with respect to the i-vectors 38 used in a previous adaptation process of the classifier, or any other criterion. Since the adaptation module 230 is coupled to the decision module 218, the adaptation module is configured to receive information regarding whether a current speaker verification is successful or not and decide accordingly whether or not to select the corresponding i-vector(s). According to at least one embodiment, the adaptation module may select i-vectors that did not result in successful speaker verification in a first attempt. For example, upon a failed speaker verification, further authentication information 15, e.g., account number, social security number, or the like, may be requested and received from the corresponding user. The speaker verification decision 50 may then be changed by the decision module 218 based on the further authentication information 15 to produce a final successful speaker verification. In addition, the adaptation module is also coupled to the classifier 215 and the data storage 220 and, as such, may have access to the i-vectors 38 previously used in training the classifier 215 during the enrollment phase. The adaptation module 230 may compare i-vectors that it maintains or considers to maintain to the i-vectors 38 to determine which i-vectors exhibit different or large variation(s) with respect to the i-vectors 38.

According to at least one aspect, not all the maintained i-vectors are incorporated in the generated new set of i-vectors with a portion of the maintained i-vectors being reserved for testing purposes. The portion of maintained i-vectors allows computing or optimally defining the decision strategy for the tuned classifier. Furthermore, the performance of the tuned classifier may be compared to that of the classifier prior to the adaptation process. As such, the adaptation module 230 may decide to update the classifier 215 only if such update results in relevant performance improvement.

Users interacting with the voice-based user-interactive system 100 may provide verification utterances or the speech signal(s) 10, through different media or channels. Users may interact with the system 100, for example, through a landline telephone network, wireless mobile network, voice over Internet Protocol (VoIP) application, automated teller machine (ATM) device, or the like. Also, each user may interact with the system 100 multiple times during which a plurality of respective voice samples are provided.

As such, the provided plurality of voice samples is more likely to represent the variability in the user's voice characteristics. As a result, the tuned or updated classifier is more likely to distinguish between intra-speaker and inter-speaker variations, therefore leading to high-level accuracy improvements with respect to the initial classifier condition.

In maintaining verification i-vectors, the adaptation module 230 does not store the provided speech signal(s) 10 or claimed ID 20. The adaptation module 230, for example, may only store the selected verification i-vectors. One may not reconstruct a speaker's voice signal and the respective lexical content using the stored i-vectors. As such, security of users' data and potential privacy requirements are realized by the system 100. Also, efficiency in data storage is achieved by storing a selection of verification i-vectors instead of storing corresponding speech signals or corresponding super-vectors. The maintained i-vectors are stored in association with corresponding users without necessarily storing the corresponding claimed IDs 20. Instead, the maintained i-vectors may be linked to corresponding users through respective internal identifiers specific to the speaker verification server. Accordingly, the claimed IDs 20 provided by users are used to enhance user authentication and to maximize correct speaker-labeling of verification i-vectors 34. In the case where the decision 50 indicates failed verification, e.g., the decision module 218 finds the verification i-vector(s) 34 generated based on the obtained speech signal(s) 10 not to be associated with the speaker, or user, identified by the claimed ID 20, further authentication measures may be initiated by the system 100 or further voice samples may be requested from the user.

According to at least one aspect, users may provide only voice sample(s) 10 but no claimed ID for user verification. In such case, verification i-vectors may be selected to be maintained by the adaptation module based on corresponding scores, e.g., 44 or 48, indicative of likelihood of matching with i-vectors 38 currently employed by the classifier 215. For example, only i-vectors corresponding to high matching scores are sent to the adaptation module 230 for potential use in classifier adaptation. As such, the likelihood of speaker-labeling errors, of i-vectors selected to be used by the adaptation module, are minimized.

As part of the adaptation process, the adaptation module 230 may initiate or cause retraining of the classifier, for example, using a new set of i-vectors than those used in a previous training/retraining process, cause update of a set of i-vectors 38 maintained in the data storage 220, cause update of parameters associated with the normalizing module 216 or the decision module 218, or cause update of update parameters, decision rules, or criteria associated with the adaptation module 230 may add at least one new i-vector, remove at least one previously stored i-vector, or modify at least one previously stored i-vector using i-vector(s) maintained by the adaptation module, e.g., using averaging or weighted averaging. The adaptation module 230 may store its maintained i-vectors in the data storage 220 or in a memory or database associated with adaptation module 230. Parameters associated with the score normalization module or the decision module 218 may be updated based on parameters of the tuned classifier 215. In updating i-vectors 38 stored in the data storage 220, the adaptation module 230 may modify one or more of its attributes indicative of criteria of when a next adaptation process is to be performed based on classifier performance improvement achieved as result of a current adaptation process.

A person skilled in the art should appreciate that the classifier 215 is not constrained a particular type but rather may include PLDA, LDA-WCCN, SVM, or other types of classifiers. Also the score normalization module 216 may employ a normalization technique such as the Z-Norm, T-Norm, S-Norm, the cohort method, or the like. The score normalization module 216 is optional in the speaker verification server. A person skilled in the art should also appreciate that the verification server 200 may further employ voice model adaptation. Voice model adaptation may be employed using i-vectors instead of speech signals 10.

Figure 3:
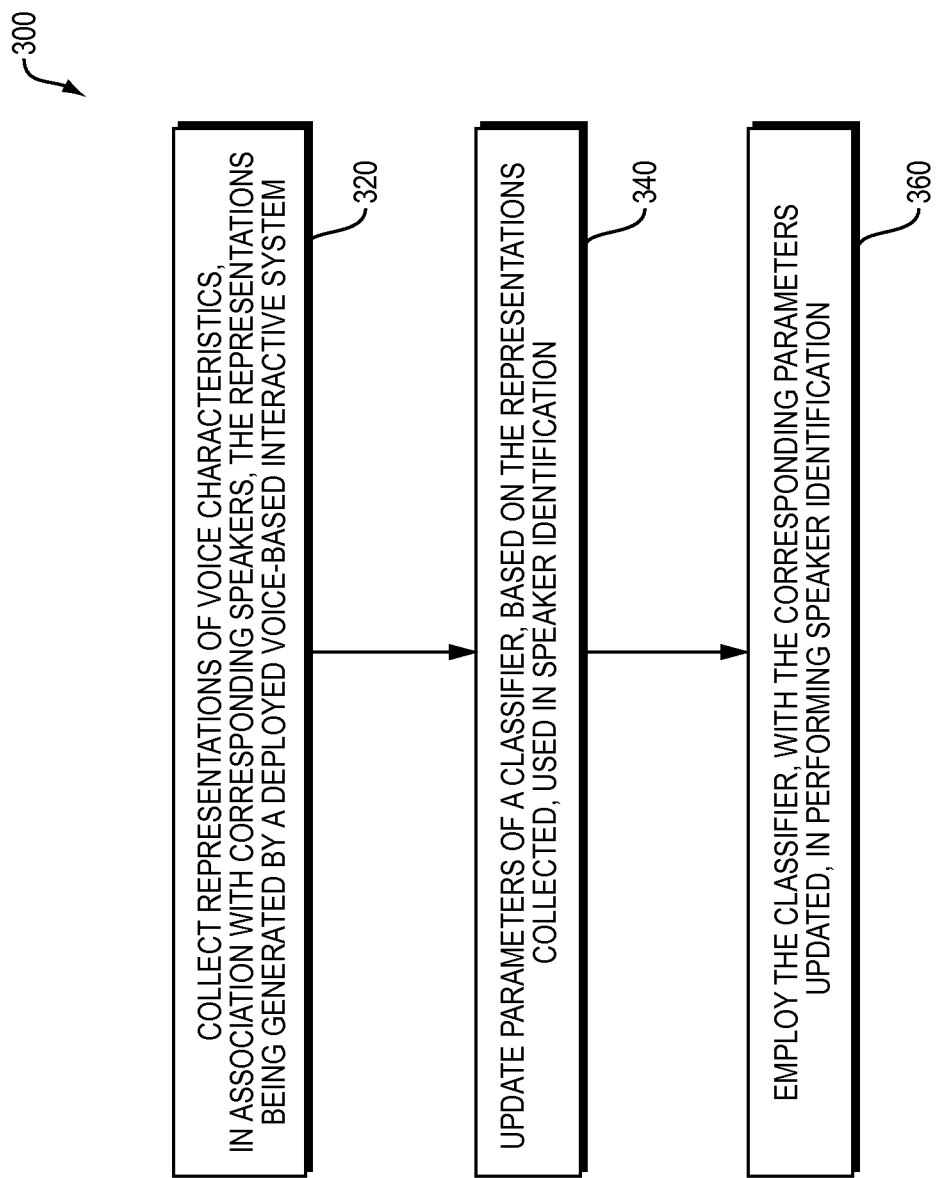
FIG. 3 is a flowchart illustrating a method of adaptive user verification according to at least one embodiment.

FIG. 3 is a flowchart illustrating a method 300 of adaptive user verification according to at least one embodiment. At block 320, representations of voice characteristics, in association with corresponding speakers, are collected. The representations are generated by the deployed voice-based interactive system 100. The i-vectors are commonly used as representations of voice characteristics. A person skilled in the art should appreciate that corresponding super-vectors may also be used as representations of voice characteristics instead of the i-vectors, however, the use of super-vectors results in a more complex verification system from memory and computational perspective. At block 340, parameters of the classifier 215, used in speaker identification, are updated based on the collected representations collected. Updating the parameters of the classifier 215 includes, for example, retraining the classifier using a new set of representations of voice characteristics different from another set previously used to train or retrain the classifier. The new set is determined based at least in part on the collected representations. At block 360, the updated or tuned classifier 215, with the corresponding updated parameters, is employed in performing speaker identification.

FIGS. 4A and 4B show Tables 420 and 480, respectively, illustrating simulation results of adaptive user verification according to at least one embodiment. Simulation experiments are performed and the corresponding speaker verification performance results are presented in the Tables 420 and 480. The Table 420 in FIG. 4A illustrates results when using the expression "zero-one-two-three-four-five-six-seven-eight-nine," referred to hereinafter a ZN, as the utterance to be uttered by users as they interact with the system. The Table 480 in FIG. 4B illustrates results when using a personal, common telephone number starting with area code, referred to hereinafter a PCTN, as the utterance to be uttered by users as they interact with the system. The speaker verification system used in the simulation experiments employs a PLDA classifier. During the enrollment phase, a set of utterances corresponding to 400 speakers are used for enrollment. In testing the speaker verification system, a set of utterances corresponding to the same 400 speakers and another set of utterances corresponding to 300 impostor speakers are used. The number of speakers indicated in the first column in the Tables 420 and 480 represent subsets of the 400 speakers used in the enrollment phase.

The accuracy of the tested speaker verification system is measured in terms of equal error rate (EER), which corresponds to the operating point where the percentage of falsely accepted speakers is equal to the percentage of falsely rejected speakers. In other words, the lower the EER, the better is the speaker verification accuracy. The baseline EER, i.e., EER measured prior to any adaptation procedure, is equal to 1.4% when using the ZN expression and 1.6% when using the PCTN expression as the utterance repeated by users. In the simulation experiments, different adaptation scenarios, in terms of the number of speakers or the number of times the used utterance ZN or PCTN is repeated, are applied to the classifier of the tested speaker verification. Each of the Tables 420 and 480 shows a first set of EER results, 421 or 481, and a second set of EER results, 423 and 483, corresponding respectively to "Supplemental Retraining" simulations and "Replacement Retraining" simulations. In the "Supplemental Retraining" simulations, the original training data is supplemented with adaptation data. In other words, the data used in performing supplemental retraining includes previously used enrollment data and adaptation data. In the "Replacement Retraining" simulations, the original training data is replaced by the adaptation data. As such, the data used to perform replacement retraining includes the adaptation data but not the previously used enrollment data.

The simulations results shown in the Tables 420 and 480 clearly show that the performance of the speaker verification consistently improves with adaptation. The results shown in Table 420 correspond to 1200 true-speaker trials, e.g., authentication attempts of speakers from the 400 speakers enrolled, and 12376 impostor trials, e.g., authentication attempts of speakers from the 300 impostor speakers. The results shown in Table 480 correspond to 1200 true-speaker trials and 12376 impostor trials. In designing such trials, different numbers of repetitions of an utterance by a each speaker are considered in each trial, e.g., five, seven, and nine repetitions per trial. Providing multiple utterances by each speaker increases the likelihood that the resulting audio data accommodates intra-speaker variations. Using data corresponding to a large number of speakers increases the likelihood of modeling inter-speaker variability. According to the results shown in the tables 420 and 480, the improvement in the speaker verification performance increases with increase in the number of voice samples used in the adaptation process. For example, when the supplemental retraining is applied with voice samples corresponding to the expression ZN, the measured EER is equal to 1.3%, for adaptation data associated with 130 speakers each providing five utterances of the expression ZN. However, the measured EER is equal to 1.1%, for adaptation data associated with 400 speakers each providing five utterances, and 1.2%, for adaptation data associated with 130 speakers each providing nine utterances.

The results shown in the tables 420 and 480 clearly illustrate that "Replacement Retraining" provides better improvement in performance, with respect to the corresponding measured baseline EER, compared to "Supplemental Retraining" when a large enough number of speakers, e.g., larger than 200 speakers, is used. Specifically, the reduction in EER, with respect to the corresponding measured baseline EER, achieved when using "Replacement Retraining" may be higher than 80%, according to the results shown in the tables 420 and 480.

A person skilled in the art should appreciate that employing classifier adaptation based on field data collected by a deployed system, improves speaker verification performance. The effect of classifier adaptation on speaker verification performance is clearly illustrated by the simulation results shown in FIGS. 4A and 4B. A person skilled in the art should also appreciate that selecting i-vectors to be used in adaptation based on corresponding verification results or claimed IDs 20 provided by respective users enables automatic and highly accurate speaker-labeling of the adaptation data. Furthermore, by maintaining only i-vectors in association with respective users, the respective voice signals and the corresponding lexical content may not be reconstructed. As such, the speaker verification server 200 and the voice-based user interactive system 100 provide a relatively high level of security of the user data and the users' privacy.

It should be understood that the example embodiments described above may be implemented in many different ways. In some instances, the various methods and machines described herein may each be implemented by a physical, virtual or hybrid general purpose or application specific computer having a central processor, memory, disk or other mass storage, communication interface(s), input/output (I/O) device(s), and other peripherals. The general purpose or application specific computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., that enables the transfer of information between the elements. One or more central processor units are attached to the system bus and provide for the execution of computer instructions. Also attached to the system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a computer readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transitory machine-readable medium, which may be read and executed by one or more processors. A non-transitory machine-readable medium may include any mechanism for storing or transmitting information in a form readable by a machine, e.g., a computing device. For example, a non-transitory machine-readable medium may include read only memory (ROM); random access memory (RAM); magnetic disk storage media; optical storage media; flash memory devices; and others.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method of performing speaker recognition, the method comprising:
   collecting representations of voice characteristics, in association with corresponding speakers, the representations being generated by a deployed voice-based interactive system;
   updating system-level parameters of a classifier used in speaker recognition, based on the representations collected, the representations collected being indicative of inter-speaker and intra-speaker variations in voice characteristics, the system-level parameters updated to improve distinguishability between different speakers by maximizing inter-speaker variations while accommodating intra-speaker variability, wherein updating the system-level parameters of the classifier includes updating the system-level parameters each time a given number of successful identifications of at least one speaker is achieved; and
   employing the classifier, with the corresponding system-level parameters updated, in performing speaker recognition.

2. A method according to claim 1 further comprising updating at least one score normalization employed by the classifier.

3. A method according to claim 1 further comprising:
   collecting a representation of a speaker identity in association with at least one representation of voice characteristics of a corresponding speaker; and
   comparing the representation of the speaker identity collected to a speaker identification provided by the classifier.

4. A method according to claim 1 further comprising computing the representations of voice characteristics based on field data received by the deployed voice-based interactive system.

5. A method according to claim 1 further comprising generating the representations of voice characteristics.

6. A method according to claim 1, wherein updating the system-level parameters of the classifier includes updating the system-level parameters based on a subset of the representations of the voice characteristics collected.

7. A method according to claim 6 further comprising selecting the subset of the representations based on representations associated with successful identification of the at least one speaker by the deployed voice-based interactive system.

8. A method according to claim 7 further comprising selecting the subset of the representations based on representations exhibiting large variations with respect to corresponding representations previously maintained by the deployed voice-based interactive system.

9. A method according to claim 1, wherein updating the system-level parameters of the classifier includes updating one or more representations of voice characteristics associated with the at least one speaker.

10. An apparatus of performing speaker recognition, the apparatus comprising:
    at least one processor; and
    at least one memory with computer code instructions stored thereon,
    the at least one processor and the at least one memory, with the computer code instructions, being configured to cause the apparatus to:
    collect representations of voice characteristics, in association with corresponding speakers, the representations being generated by a deployed voice-based interactive system;
    update system-level parameters of a classifier, used in speaker recognition, based on the representations collected, the representations collected being indicative of inter-speaker and intra-speaker variations in voice characteristics, the system-level parameters updated to improve distinguishability between different speakers by maximizing inter-speaker variations while accommodating intra-speaker variability, wherein in updating the system-level parameters of the classifier, the at least one processor and the at least one memory, with the computer code instructions, being configured to cause the apparatus to update the system-level parameters each time a given number of successful identifications of at least one speaker is achieved; and
    employ the classifier, with the corresponding system-level parameters updated, in performing speaker recognition.

11. An apparatus according to claim 10, wherein the at least one processor and the at least one memory, with the computer code instructions, being configured to cause the apparatus to further update at least one score normalization employed by the classifier.

12. An apparatus according to claim 10, wherein the at least one processor and the at least one memory, with the computer code instructions, being configured to cause the apparatus to further:
    collect a representation of a speaker identity in association with at least one representation of voice characteristics of a corresponding speaker; and
    compare the representation of the speaker identity collected to a speaker identification provided by the classifier.

13. An apparatus according to claim 10, wherein the at least one processor and the at least one memory, with the computer code instructions, being configured to cause the apparatus to further compute the representations of voice characteristics based on field data received by the deployed voice-based interactive system.

14. An apparatus according to claim 10, wherein the at least one processor and the at least one memory, with the computer code instructions, being configured to cause the apparatus to further generate the representations of voice characteristics.

15. An apparatus according to claim 10, wherein in updating the system-level parameters of the classifier, the at least one processor and the at least one memory, with the computer code instructions, being configured to cause the apparatus to update the system-level parameters based on a subset of the representations of the voice characteristics collected.

16. An apparatus according to claim 15, wherein the at least one processor and the at least one memory, with the computer code instructions, being configured to cause the apparatus to further select the subset of the representations based on representations associated with successful identification of the at least one speaker by the deployed voice-based interactive system.

17. An apparatus according to claim 16, wherein the at least one processor and the at least one memory, with the computer code instructions, being configured to cause the apparatus to further select the subset of the representations based on representations exhibiting large variations with respect to corresponding representations previously maintained by the deployed voice-based interactive system.

18. A non-transitory computer-readable medium with computer software instructions stored thereon, the computer software instructions when executed by a processor cause an apparatus to perform:

collecting representations of voice characteristics, in association with corresponding speakers;

updating system-level parameters of a classifier, used in speaker recognition, based on the representations collected, the representations collected being indicative of inter-speaker and intra-speaker variations in voice characteristics, the system-level parameters updated to improve distinguishability between different speakers by maximizing inter-speaker variations while accommodating intra-speaker variability, wherein updating the system-level parameters of the classifier includes updating the system-level parameters each time a given number of successful identifications of at least one speaker is achieved; and employing the classifier, with the corresponding system-level parameters updated, in performing speaker recognition.

* * * * *